(12) United States Patent
Kumar

(10) Patent No.: US 11,368,185 B2
(45) Date of Patent: Jun. 21, 2022

(54) SHARING FREQUENCY GENERATOR SETTINGS IN NETWORKS

(71) Applicant: QUALCOMM Incorporated, San Diego, CA (US)

(72) Inventor: Akash Kumar, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 80 days.

(21) Appl. No.: 16/922,627

(22) Filed: Jul. 7, 2020

(65) Prior Publication Data
US 2021/0021299 A1    Jan. 21, 2021

Related U.S. Application Data

(60) Provisional application No. 62/875,269, filed on Jul. 17, 2019.

(51) Int. Cl.
*H04B 1/7136* (2011.01)
*H04W 76/38* (2018.01)
(Continued)

(52) U.S. Cl.
CPC ......... *H04B 1/7136* (2013.01); *H04B 1/7143* (2013.01); *H04B 1/7156* (2013.01);
(Continued)

(58) Field of Classification Search
CPC ...... H04B 1/005; H04B 1/401; H04B 1/7136; H04B 1/7143; H04B 1/7156;
(Continued)

(56) References Cited

U.S. PATENT DOCUMENTS

| 5,852,630 A * | 12/1998 | Langberg ............ H04L 27/2647 375/219 |
| 2009/0213806 A1 * | 8/2009 | Ode ........................ H04W 8/22 370/329 |

(Continued)

FOREIGN PATENT DOCUMENTS

| EP | 2081395 A1 | 7/2009 |
| JP | 2012090273 A | 5/2012 |

OTHER PUBLICATIONS

PCT/2007/058490 A by Go, Gwangzeen (Year: 2007).*
(Continued)

*Primary Examiner* — Siu M Lee
(74) *Attorney, Agent, or Firm* — Qualcomm Incorporated

(57) ABSTRACT

Sharing of frequency generator settings in a network are disclosed. In a particular implementation, a method of wireless communication includes determining, by a user equipment (UE), a first frequency setting for a frequency generator of a UE. The first frequency setting is associated with a first frequency. The method includes modifying the first frequency setting to generate a second frequency setting for the frequency generator. The second frequency setting is associated with a second frequency that is different from the first frequency. The method also includes generating a message that indicates the second frequency setting. The method further includes transmitting the message from the UE to a base station.

30 Claims, 9 Drawing Sheets

(51) Int. Cl.
*H04B 1/7143* (2011.01)
*H04B 1/7156* (2011.01)
*H04W 72/04* (2009.01)

(52) U.S. Cl.
CPC ....... *H04W 72/0453* (2013.01); *H04W 76/38* (2018.02); *H04B 2001/71362* (2013.01); *H04B 2001/71563* (2013.01)

(58) Field of Classification Search
CPC ........... H04B 2001/71362; H04B 2001/71363; H04W 72/0453; H04W 76/38
See application file for complete search history.

(56) References Cited

U.S. PATENT DOCUMENTS

| | | | |
|---|---|---|---|
| 2009/0323608 A1* | 12/2009 | Adachi | H04W 28/20 370/329 |
| 2010/0034108 A1* | 2/2010 | Ode | H04L 5/005 370/252 |
| 2011/0151791 A1* | 6/2011 | Snider | G08B 25/08 455/63.1 |

OTHER PUBLICATIONS

International Search Report and Written Opinion—PCT/US2020/041251—ISA/EPO—dated Oct. 28, 2020 (192983WO).

* cited by examiner

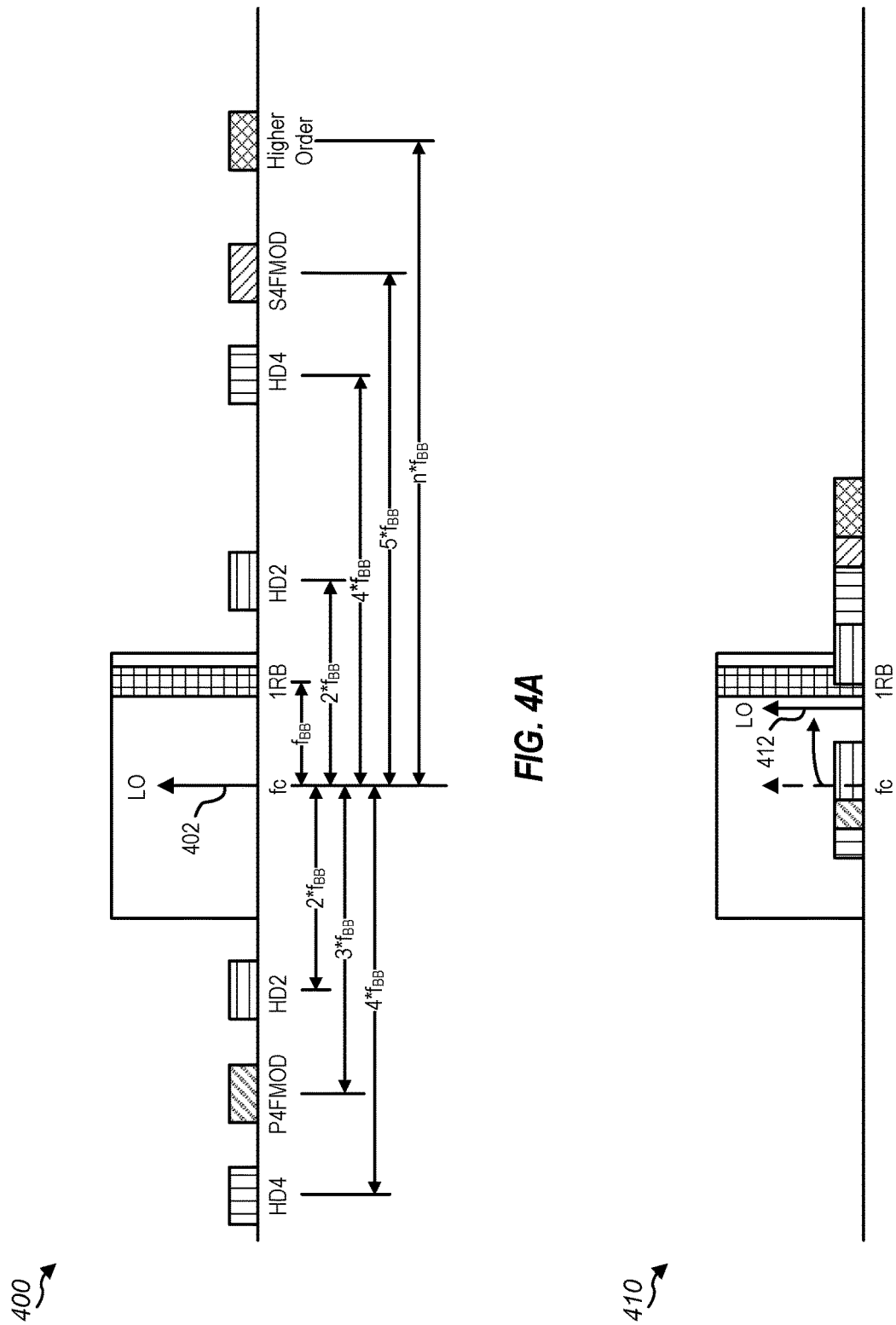

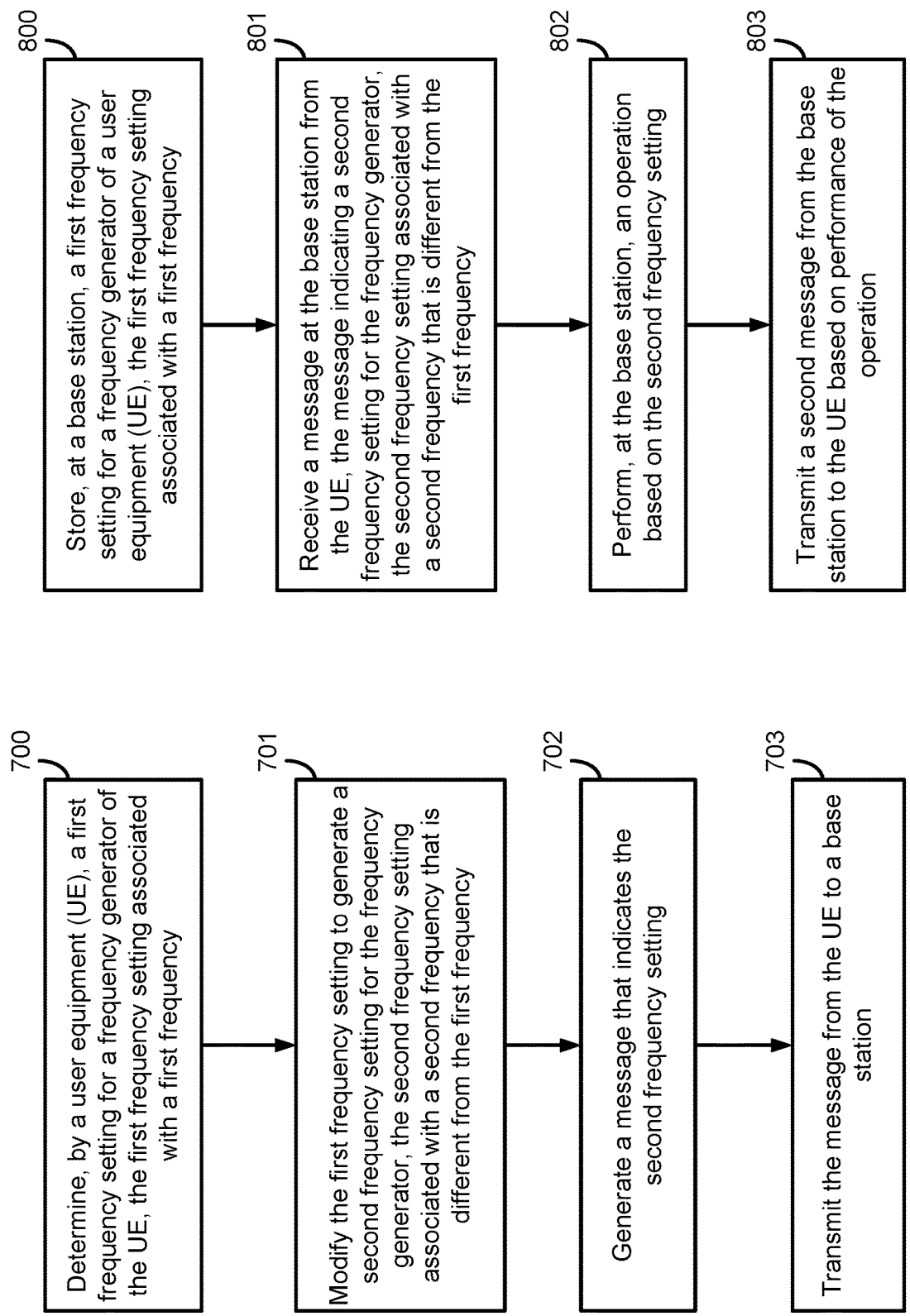

SHARING FREQUENCY GENERATOR SETTINGS IN NETWORKS

CROSS-REFERENCE TO RELATED APPLICATIONS

This application claims the benefit of U.S. Provisional Patent Application No. 62/875,269, entitled, "SHARING FREQUENCY GENERATOR SETTINGS IN NETWORKS," filed on Jul. 17, 2019, which is expressly incorporated by reference herein in its entirety.

BACKGROUND

Field

Aspects of the present disclosure relate generally to wireless communication systems, and more particularly, by way of example but not limitation, to frequency generator (e.g., local oscillator) settings.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. As mobile communications technologies advance, new technologies are being studied. For example, 3GPP is developing a standard for a fifth generation (5G) mobile communications technology. 5G technology builds upon the techniques of fourth generation (4G) technology and long-term evolution (LTE) technology to further enhance mobile communications. 5G technology is a current research topic for a variety of companies, universities, and others.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the 5G technologies not only to meet the growing demand for mobile broadband access, but to advance and enhance the user experience with mobile communications.

SUMMARY

The described techniques relate to improved methods, systems, devices, and apparatuses that support sharing of frequency settings of a frequency generator of a UE with a network (e.g., with a base station). For example, a UE may modify a first frequency setting of a frequency generator, such as a local oscillator, to generate a second frequency setting. Modifying the first frequency setting may be performed in order to support advanced features, such as fast frequency hopping, offset zero intermediate frequency (OZIF)/low intermediate frequency (LIF) operations, shared receive/transmit carrier aggregation, and band jammer and interference reduction, as non-limiting examples, or to support co-existence in multi-radio or multiple subscription devices. After the second frequency setting is selected, the UE may share the second frequency setting with a base station. For example, the UE may transmit a message that indicates the second frequency setting to the base station. In a particular implementation, the message is a UE assistance information message. In some implementations, the UE assistance information message may include an extendedRFSignalling field that indicates the second frequency setting. In some other implementations, the message is a media access control (MAC) control element. Once the base station has received the second frequency setting, the base station may use the second frequency setting (instead of the first frequency setting) in performing one or more operations, such as direct current (DC) cancellation or scheduling of a DC subcarrier, as non-limiting examples. Performing such operations using the second frequency setting (e.g., the actual frequency setting at the UE, as opposed to a prior frequency setting that is no longer used) may improve various transmit performance metrics associated with the UE and as measured by the base station, such as error vector magnitude (EVM), adjacent channel leakage ratio (ACLR), spectrum emission mask (SEM), and/or occupied bandwidth (OBW), which may also improve metrics such as signal-to-noise ratio (SNR) and effective maximum throughput.

In one aspect of the disclosure, a method of wireless communication includes determining, by a user equipment (UE), a first frequency setting for a frequency generator of the UE. The first frequency setting is associated with a first frequency. The method includes modifying the first frequency setting to generate a second frequency setting for the frequency generator. The second frequency setting is associated with a second frequency that is different than the first frequency. The method also includes generating a message that indicates the second frequency setting. The method further includes transmitting the message from the UE to a base station.

In an additional aspect of the disclosure, an apparatus configured for wireless communication includes means for determining a first frequency setting for a frequency generator of a user equipment (UE). The first frequency setting is associated with a first frequency. The apparatus includes means for modifying the first frequency setting to generate a second frequency setting for the frequency generator. The second frequency setting is associated with a second frequency that is different from the first frequency. The apparatus also includes means for generating a message that indicates the second frequency setting. The apparatus further includes means for transmitting the message to a base station.

In an additional aspect of the disclosure, a non-transitory computer-readable medium having program code recorded thereon. The program code further includes code to determine, by a user equipment (UE), a first frequency setting for a frequency generator of the UE. The first frequency setting is associated with a first frequency. The program code also includes code to modify the first frequency setting to generate a second frequency setting for the frequency generator. The second frequency setting is associated with a second frequency that is different from the first frequency. The code includes code to generate a message that indicates the second frequency setting. The code further includes code to initiate transmission of the message from the UE to a base station.

In an additional aspect of the disclosure, an apparatus configured for wireless communication is disclosed. The apparatus includes at least one processor, and a memory coupled to the processor. The memory stores instructions that, when executed by the at least one processor, cause the at least one processor to determine, by a user equipment (UE), a first frequency setting for a frequency generator of the UE. The first frequency setting is associated with a first frequency. The instructions cause the at least one processor to modify the first frequency setting to generate a second frequency setting for the frequency generator. The second frequency setting is associated with a second frequency that is different from the first frequency. The instructions also cause the at least one processor to generate a message that indicates the second frequency setting. The instructions further cause the at least one processor to initiate transmission of the message from the UE to a base station.

In another aspect of the disclosure, a method of wireless communication includes storing, at a base station, a first frequency setting for a frequency generator of a user equipment (UE), the first frequency setting associated with a first frequency. The method includes receiving a message at the base station from the UE. The message indicates a second frequency setting for the frequency generator. The second frequency setting is associated with a second frequency that is different from the first frequency. The method also includes performing, at the base station, an operation based on the second frequency setting. The method further includes transmitting a second message from the base station to the UE based on performance of the operation.

In an additional aspect of the disclosure, an apparatus configured for wireless communication includes means for storing a first frequency setting for a frequency generator of a user equipment (UE). The first frequency setting is associated with a first frequency. The apparatus includes means for receiving a message from the UE. The message indicates a second frequency setting for the frequency generator. The second frequency setting is associated with a second frequency that is different from the first frequency. The apparatus also includes means for performing an operation based on the second frequency setting. The apparatus further includes means for transmitting a second message to the UE based on performance of the operation.

In an additional aspect of the disclosure, a non-transitory computer-readable medium having program code recorded thereon. The program code further includes code to store, at a base station, a first frequency setting for a frequency generator of a user equipment (UE). The first frequency setting is associated with a first frequency. The program code includes code to receive a message at the base station from the UE. The message indicates a second frequency setting for the frequency generator. The second frequency setting is associated with a second frequency that is different from the first frequency. The program code also includes code to perform, at the base station, an operation based on the secondary frequency setting. The program code further includes code to initiate transmission of a second message from the base station to the UE based on performance of the operation.

In an additional aspect of the disclosure, an apparatus configured for wireless communication is disclosed. The apparatus includes at least one processor, and a memory coupled to the processor. The stores instructions that, when executed by the at least one processor, cause the at least one processor to store, at a base station, a first frequency setting for a frequency generator of a user equipment (UE). The first frequency setting is associated with a first frequency. The instructions cause the at least one processor to receive a message at the base station from the UE. The message indicates a second frequency setting for the frequency generator. The second frequency setting is associated with a second frequency that is different from the first frequency. The instructions also cause the at least one processor to perform, at the base station, an operation based on the second frequency setting. The instructions further cause the at least one processor to initiate transmission of a second message from the base station to the UE based on performance of the operation.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 4A-4B illustrate examples of frequency settings for a frequency generator in accordance with aspects of the present disclosure.

FIGS. 5A-5B illustrate examples of media access control (MAC) control elements (CEs) for conveying frequency generator settings according to aspects of the present disclosure.

FIG. 7 is a block diagram illustrating example blocks executed by a UE configured according to an aspect of the present disclosure.

FIG. 8 is a block diagram illustrating example blocks executed by a base station configured according to an aspect of the present disclosure.

DETAILED DESCRIPTION

Figure 1:
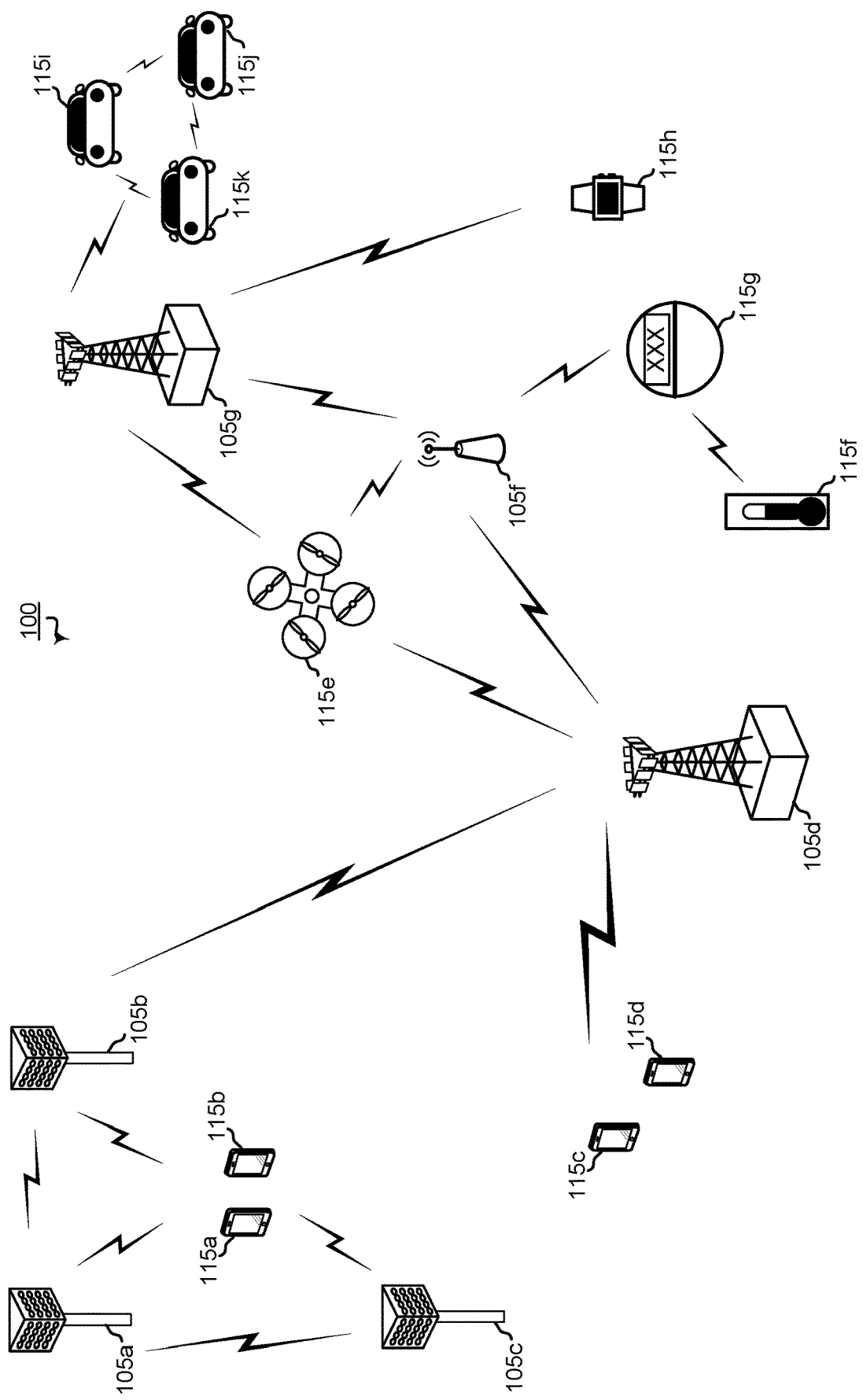
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In particular, the systems, methods, devices, and apparatuses described herein enable communication of a frequency setting of a frequency generator at a user equipment (UE) to a base station, for use by the base station in performing one or more operations. To illustrate, in some wireless communications systems, frequency generators of UEs, such as local oscillators, are typically set to a frequency in the center of a carrier bandwidth used by the UE. This frequency setting is provided to the base station (e.g., during an initial connection/ association), which may use the frequency setting during performance of one or more operations. As UEs have advanced, some UEs include the capability to change the frequency setting of the local oscillator, for example to support one or more advanced features. However, the base station remains unaware of the change in the frequency setting of the local oscillator at the UE.

To provide the base station with the most up-to-date frequency setting of the frequency generator, the UE may transmit a message that includes an updated frequency setting to the base station. In a particular implementation, the message is a UE assistance information message. In some implantations, the UE assistance information message may include an extendedRFSignalling field that indicates the updated frequency setting. In other implementations, the message is a media access control (MAC) control element. In this manner, the base station may receive and use the updated frequency setting in performing one or more operations, such as direct current (DC) cancellation or scheduling of a DC subcarrier, as non-limiting examples, to improve performance of the UE, the network, or both. Performing the one or more operations based on the updated frequency setting, instead of an outdated initial setting, improves the effectiveness of the one or more operations, which improves performance of the UE, the network, or both.

In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~9999% reliability), ultra-low latency (e.g., 1 ms), and users with wide ranges of mobility or lack thereof, and (3) with enhanced mobile broadband including extreme high capacity (e.g., 10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.). Wireless network 100 may include one or more user equipment (UE) that modify a setting of a frequency oscillator at the UE and that communicate the setting to a base station via wireless network 100, as further described herein with reference to FIG. 3.

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access 5G network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
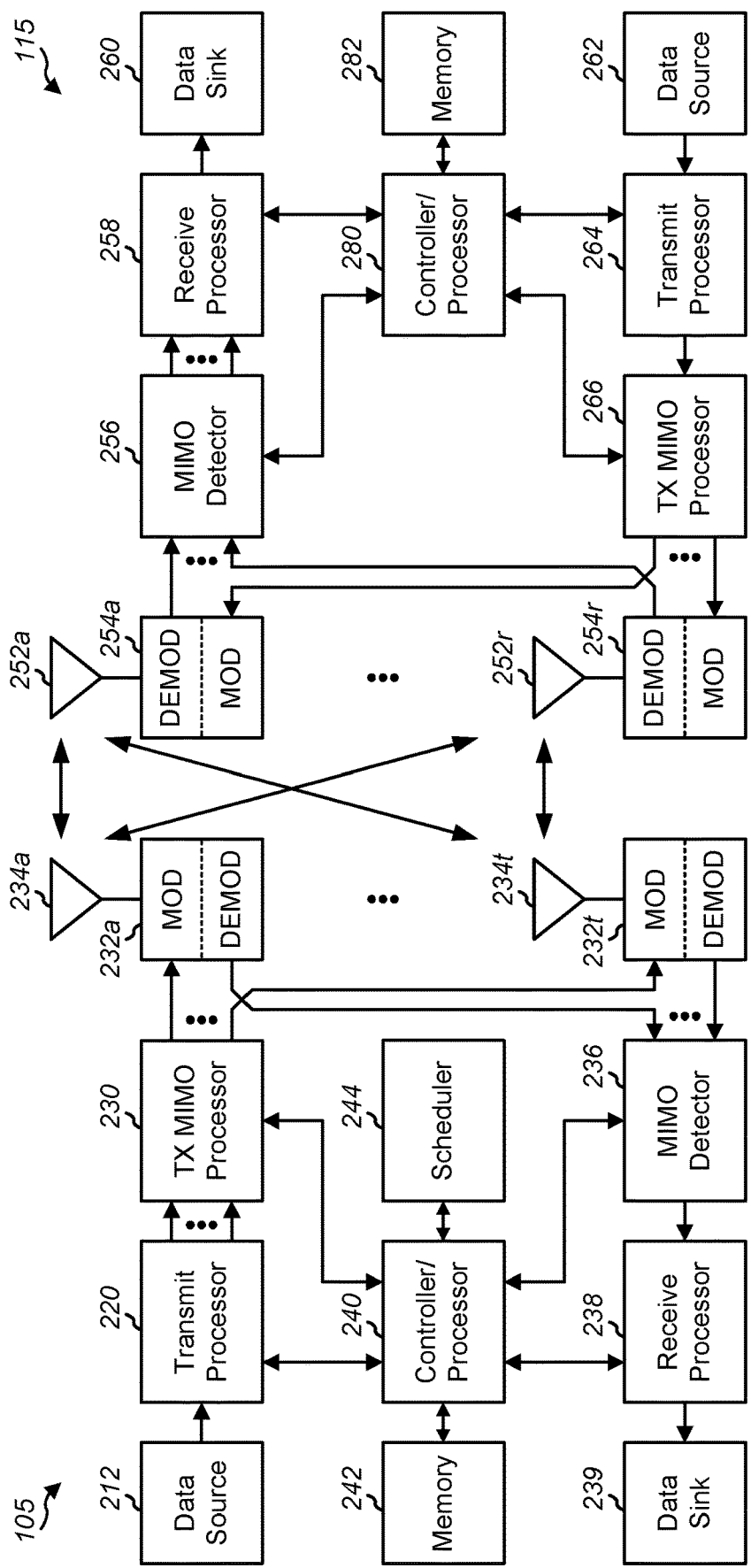
FIG. 2 is a block diagram conceptually illustrating a design of a base station/eNB and a UE configured according to one aspect of the present disclosure.

FIG. 2 shows a block diagram of a design of a base station 105 and a UE 115, which may be any of the base stations and one of the UEs in FIG. 1. FIG. 2 illustrates components used to communicate signals between base station 105 and UE 115. Such signals may include an update of a frequency setting of a frequency generator at UE 115, which is communicated from UE 115 to base station 105, as further described with reference to FIG. 3. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 7 and 8, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
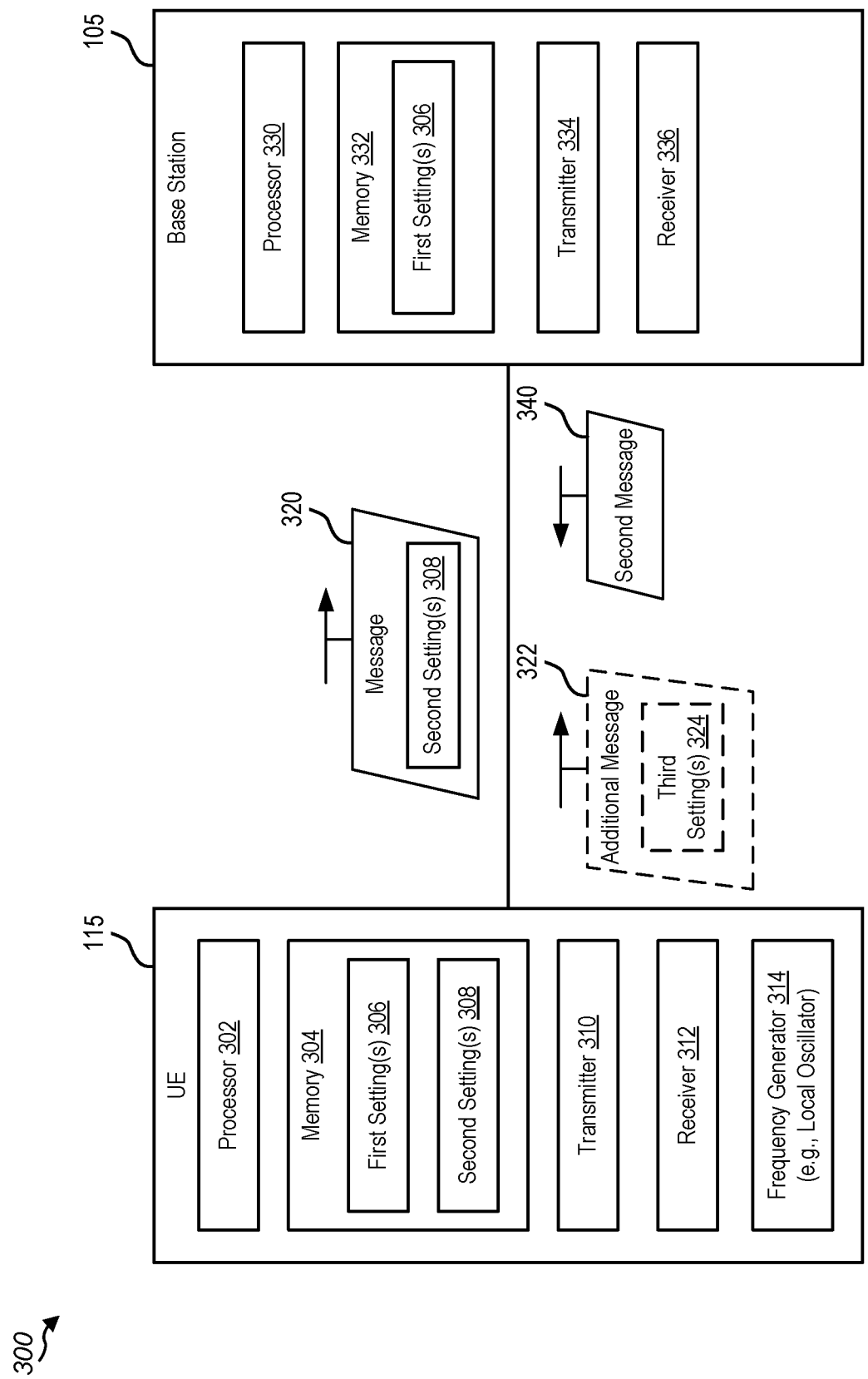
FIG. 3 is a block diagram illustrating an example of a wireless communications system that shares frequency settings for a frequency generator of a UE in accordance with aspects of the present disclosure

FIG. 3 illustrates an example of a wireless communications system 300 that supports sharing of frequency generator settings in accordance with aspects of the present disclosure. In some examples, wireless communications system 300 may implement aspects of wireless communication system 100. For example, wireless communications system 300 may include UE 115 and base station 105. Although one UE and one base station are illustrated, in other implementations, wireless communications system 300 may include multiple UEs 115, multiple base stations 105, or both.

UE 115 includes processor 302, memory 304, transmitter 310, receiver 312, and frequency generator 314. Processor 302 may be configured to execute instructions stored at memory 304 to perform the operations described herein. In some implementations, processor 302 includes or corresponds to controller/processor 280, and memory 304 includes or corresponds to memory 282. Memory 304 may also be configured to store frequency settings associated with frequency generator 314, as further described herein.

Transmitter 310 is configured to transmit data to one or more other devices, and receiver 312 is configured to receive data from one or more other devices. For example, transmitter 310 may transmit data, and receiver 312 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 310 and receiver 312 may be replaced with a transceiver. Additionally, or alternatively, transmitter 310, receiver, 312, or both may include or correspond to one or more components of UE 115 described with reference to FIG. 2.

Frequency generator 314 is configured to generate a signal having a particular frequency, based on a frequency setting. In a particular implementation, frequency generator 314 includes a local oscillator (LO). In other implementations, frequency generator 314 includes a different type of signal generator. The frequency of the signal output by frequency generator 314 may be modified by changing the frequency setting associated with frequency generator 314. For example, frequency generator 314 may be configured to be set to one of multiple frequency settings at a given time, and the frequency setting determines the frequency of the output signal.

Base station 105 includes processor 330, memory 332, transmitter 334, and receiver 336. Processor 330 may be configured to execute instructions stores at memory 332 to perform the operations described herein. In some implementations, processor 330 includes or corresponds to controller/processor 240, and memory 332 includes or corresponds to memory 242. Memory 332 may also be configured to store frequency settings associated with frequency generator 314, as further described herein.

Transmitter 334 is configured to transmit data to one or more other devices, and receiver 336 is configured to receive data from one or more other devices. For example, transmitter 334 may transmit data, and receiver 336 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 334 and receiver 336 may be replaced with a transceiver. Additionally, or alternatively, transmitter 334, receiver, 336, or both may include or correspond to one or more components of base station 105 described with reference to FIG. 2.

During operation of wireless communications system 300, a first setting 306 is set (e.g., by processor 302) for frequency generator 314. For example, the first setting 306 may be set during an initial setup process of UE 115 (e.g., a radio resource control (RRC) configuration of UE 115). First setting 306 represents a frequency in approximately the center of a carrier bandwidth that UE 115 is configured to communicate via. Based on the first setting 306, frequency generator 314 outputs a signal having a first frequency, which may be used for upconverting or downconverting signals received or transmitted by UE 115 (e.g., by transmitter 310 and/or receiver 312). During the initial setup process, first setting 306 is provided to base station 105, and base station 105 stores first setting 306 at memory 332. Base station 105 may perform one or more operations, such as direct current (DC) cancellation or scheduling for a DC subcarrier, based on first setting 306. Performing such operations may include sending one or more messages including one or more instructions to UE 115.

At a later point in time, UE 115 (e.g., processor 302) modifies first setting 306 to generate second setting 308.

First setting 306 is associated with a first frequency, and second setting 308 is associated with a second frequency that is different from the first frequency. For example, first setting 306 may be associated with a frequency in approximately the center of a carrier bandwidth, and second setting 308 may be associated with a second frequency that is not in the center of a carrier bandwidth. Thus, first setting 306 may correspond to an initial frequency output by frequency generator 314, and second setting 308 may correspond to an adjusted frequency output by frequency generator 314. Based on the second setting 308, frequency generator 314 outputs a signal having the second frequency.

UE 115 (e.g., processor 302) may modify first setting 306 to support one or more advanced features. As a first example, UE 115 (e.g., processor 302) may modify first setting 306 based on initiation of a fast frequency hopping mode at UE 115. The fast frequency hopping mode may be associated with second setting 308 that is nearer to a frequency of a resource block (RB) assignment, as further described with reference to FIG. 4. In some implementations, the fast frequency hopping mode is initiated based on a LTE band combination in an Evolved Universal Terrestrial Radio Access—New Radio Dual Connectivity (ENDC) mode. As another example, UE 115 (e.g., processor 302) may modify first setting 306 based on activation or deactivation of one or more carriers during operation in a shared transmit mode. To illustrate, in the shared transmit mode, wideband (WB)/phase-locked loop (PLL) is common for such carriers, and separation is achieved through rotation. To further illustrate, the frequency of frequency generator 314 may be set (e.g., by processor 302) to a frequency that is between two carriers, and common TX circuitry may be used for transmission in either carrier. As another example, UE 115 (e.g., processor 302) may modify first setting 306 based on initiation of a band jammer mode at UE 115. The band jammer mode may tune frequency generator 314 to an offset with respect to the center of the carrier bandwidth to counter or reduce the in band jammer and interference from transmitter 310. In some implementations, the band jammer mode is associated with a single carrier, with carrier aggregation, or with ENDC combinations. Additionally or alternatively, UE 115 (e.g., processor 302) may modify first setting 306 to support co-existence between multiple radios or multiple subscriptions at UE 115. For example, UE 115 may be a multi-radio or multiple subscription device, and UE 115 may modify first setting 306 based on interference caused by one radio to another radio (or to communications of one subscription to communications of another subscription), another co-existence constraint, or a combination thereof.

After generating second setting 308, UE 115 (e.g., processor 302) generates a message 320. Message 320 indicates second setting 308. In a particular implementation, message 320 includes or corresponds to a UE assistance information message, and one or more information elements of the UE assistance information message indicate second setting 308. In a particular implementation, message 320 (e.g., the UE assistance information message) includes an extendedRFSignalling information element, and the extendedRFSignalling information element indicates the second frequency setting.

The following code provides an example of one implementation of a UE assistance information message:

```
-- ASN1START
-- TAG-UEASSISTANCEINFORMATION-START
UEAssistanceInformation ::= SEQUENCE {
criticalExtensions CHOICE {
ueAssistanceInformation UEAssistanceInformation-IEs,
criticalExtensionsFuture SEQUENCE{ }
}
}
UEAssistanceInformation-IEs ::= SEQUENCE {
delayBudgetReport DelayBudgetReport OPTIONAL,
extendedRFSignalling extendedRFSignalling OPTIONAL,
lateNonCriticalExtension OCTET STRING OPTIONAL,
nonCriticalExtension UEAssistanceInformation-v1540-IEs OPTIONAL
}
UEAssistanceInformation-v1540-IEs ::= SEQUENCE {
extendedRFSignalling extended RFSignalling OPTIONAL,
nonCriticalExtension SEQUENCE { } OPTIONAL
}
extendedRF Signalling ::= SEQUENCE {
LoChange SEQUENCE {
LoOffset INTEGER (0..3299, 0 to −3299),
} OPTIONAL,
reducedMaxBW-FR1 SEQUENCE {
reducedBW-FR1-DL ReducedAggregatedBandwidth,
reducedBW-FR1-UL ReducedAggregatedBandwidth
} OPTIONAL,
}
```

In another particular implementation, message 320 includes or corresponds to a media access control (MAC) control element. The MAC control element may indicate second setting 308. In a particular implementation, the MAC control element corresponds to a single carrier. In other implementations, the MAC control element corresponds to multiple carriers. The MAC control element is further described herein with reference to FIGS. 5A and 5B.

In some implementations, second setting 308 is indicated as a frequency. For example, message 320 may indicate the frequency that second setting 308 corresponds to. In other implementations, second setting 308 is indicated as an offset from first setting 306. For example, message 320 may include an offset indicating the difference between first setting 306 and second setting 308. In some such implementations, the offset is indicated by a number of subcarriers. For example, the offset may be indicated by a number of subcarriers in the range (−3299, 3299). In other implementations, the number of subcarriers may be in a different range (e.g., based on the number of digits in the field indicating the offset). Alternatively, the offset may be indicated in Hertz (Hz) from the center of the carrier.

In some implementations, UE 115 (e.g., processor 302) is configured to maintain a timer to control the number of frequency settings messages that are transmitted by UE 115 (e.g., via transmitter 310). For example, UE 115 (e.g., processor 302) may initialize a timer upon transmission of message 320, and UE 115 (e.g., processor 302) refrains from transmitting a second message until expiration of the timer. For example, if second setting 308 is modified to generate a third setting 324 at a time prior to expiration of the timer, UE 115 refrains from generating and transmitting an additional message 322 (indicating third setting 324) until expiration of the timer. In this manner, the network is not flooded with frequency adjustment messages if the settings for frequency generator 314 are rapidly being changed. The timer may have a fixed duration or may have a duration that corresponds to conditions at the network (e.g., the timer may be shorter, and thus more messages transmitted, if network conditions are favorable while the timer may be longer, and fewer messages are transmitted, if the network conditions are congested or poor).

Base station 105 receives message 320 from UE 115 via receiver 336. Message 320 is provided to processor 330 and processor 330 stores second setting 308 at memory 332.

Base station 105 (e.g., processor 330) may use second setting 308 to perform one or more operations. Performing the one or more operations may include transmitting a second message 340 from base station 105 (e.g., via transmitter 334) to UE 115 based on performance of the one or more operations. In a particular implementation, the one or more operations includes a DC cancellation operation. In another particular implementation, the one or more operations includes a scheduling operation for a DC subcarrier.

In some implementations, base station 105 (e.g., processor 330) may refrain from measuring transmit performance metrics until expiration of a particular time period. Refraining from measuring transmit performance metrics until expiration of the particular time period may enable the operation to account for second setting 308, thereby improving the transmit performance metrics when they are measured. In a particular implementation, the particular time period is fixed. For example, the particular time period may be specified in an industry standard and may be preprogrammed at base station 105 (or based on user entry). In another particular implementation, message 320 includes an indication of a duration of the particular time period. For example, UE 115 (e.g., processor 302) may assign the duration of the particular time period and include the duration in message 320.

Thus, FIG. 3 describes sharing of frequency settings for frequency generator 314 between UE 115 and base station 105. Providing updated frequency settings to base station 105 enables base station 105 to improve performance of one or more operations performed based on the updated frequency settings, such as DC cancellation or scheduling a DC subcarrier. Improving performance of such operations may improve various performance metrics associated with UE 115, such as error vector magnitude (EVM), adjacent channel leakage ratio (ACLR), spectrum emission mask (SEM, and/or occupied bandwidth (OBW), which may also improve metrics such as signal-to-noise ratio (SNR) and effective maximum throughput.

FIGS. 4A-4B illustrate examples of frequency settings for a frequency generator, such as frequency generator 314 (e.g., a LO). FIG. 4A illustrates a first graph 400 showing frequencies of various components of a transmission. As shown in FIG. 4A, the frequency generator (e.g., the LO) is tuned to a first frequency 402. In a particular implementation, first frequency 402 is located at approximately the center of a carrier bandwidth that a UE communicates via. Additional intermodulation products, such as HD2, HD4, P4FMOD, S4FMOD, and higher order modulation products are also illustrated. These intermodulation products may have frequencies that are based on a difference between first frequency 402 and a frequency of resource block 1RB that is assigned to the UE. In order to reduce the spread of the intermodulation products, the difference between first frequency 402 and the frequency of the resource block may be reduced.

FIG. 4B illustrates a second graph 410 that corresponds to a fast frequency hopping operation. As shown in FIG. 4B, the frequency of the frequency generator has been changed to second frequency 412, which is closer to the frequency range associated with the resource block 1RB. Based on this frequency change, the various intermodulation products are more closely grouped and many overlap with the communication bandwidth, which reduces interference to other UEs communicating in other frequency bandwidths. In order to communicate the change in frequency, the UE sends a message (e.g., message 320) that indicates second frequency 412 (e.g., a value of second frequency 412 or a value indicating an offset between second frequency 412 and first frequency 402) as described with reference to FIG. 3.

Figures 5A, 5B:
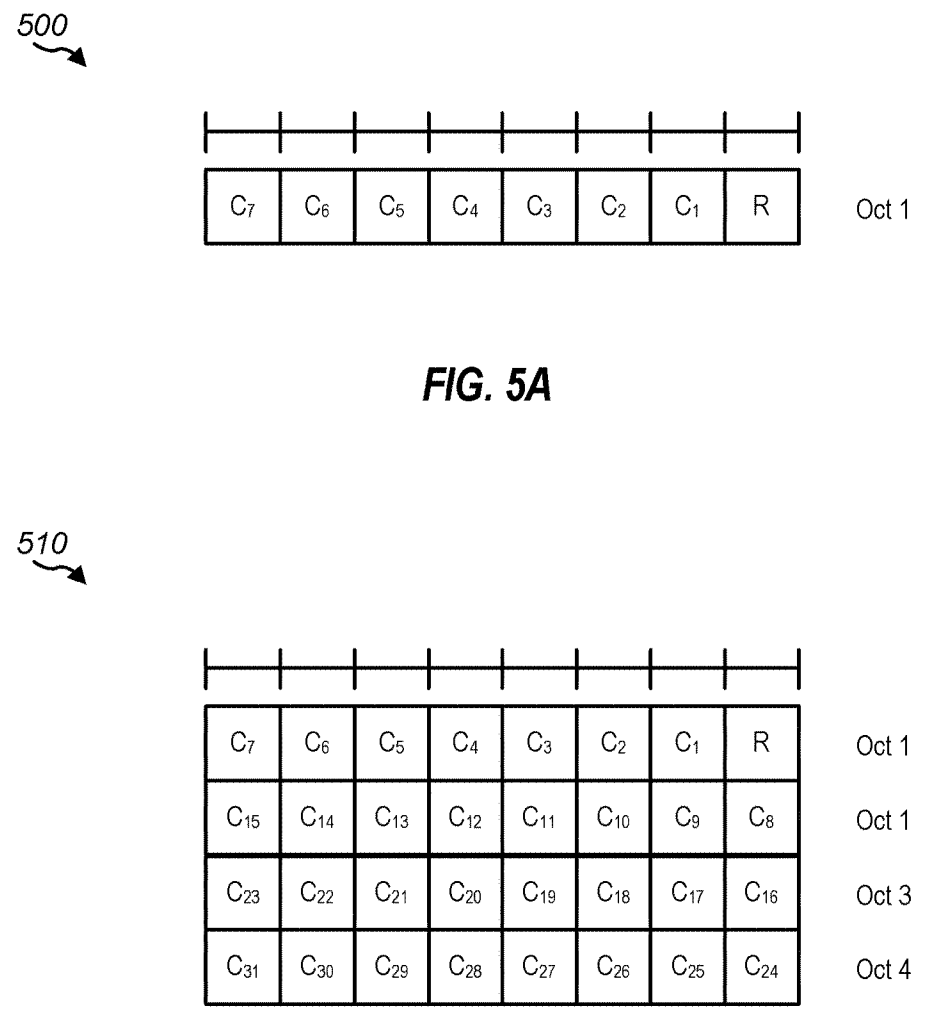

FIGS. 5A-5B illustrate examples of media access control (MAC) control elements (CEs) for conveying frequency settings of a frequency generator of a UE. For example, the UE may include or correspond to UE 115, and the MAC control elements may include or correspond to message 320 of FIG. 3.

FIG. 5A illustrates a first MAC CE 500. First MAC CE 500 corresponds to a single carrier. For example, first MAC CE 500 includes one octet of information. The one octet of information may include information for secondary cell (Scell) activation or deactivation and a plurality of bits that indicate an updated frequency of a frequency generator (e.g., a LO). As described with reference to FIG. 3, the updated frequency may be a frequency value or an offset value (from an initial frequency).

FIG. 5B illustrates a second MAC CE 510. Second MAC CE 510 corresponds to multiple carriers. For example, second MAC CE 510 includes four octets of information. The four octets of information may include information for multiple Scell activation or deactivation and a plurality of bits that indicate an updated frequency of a frequency generator (e.g., a LO). As described with reference to FIG. 3, the updated frequency may be a frequency value or an offset value (from an initial frequency).

A UE may receive transmit either first MAC CE 500 or second MAC CE 510 as message 320 to indicate an updated frequency setting for the frequency generator. Based on receipt of the respective MAC CE, a base station (e.g., base station 105) may store the updated frequency setting for use in performing one or more operations to improve transmit metrics, as described with reference to FIG. 3.

Figure 6:
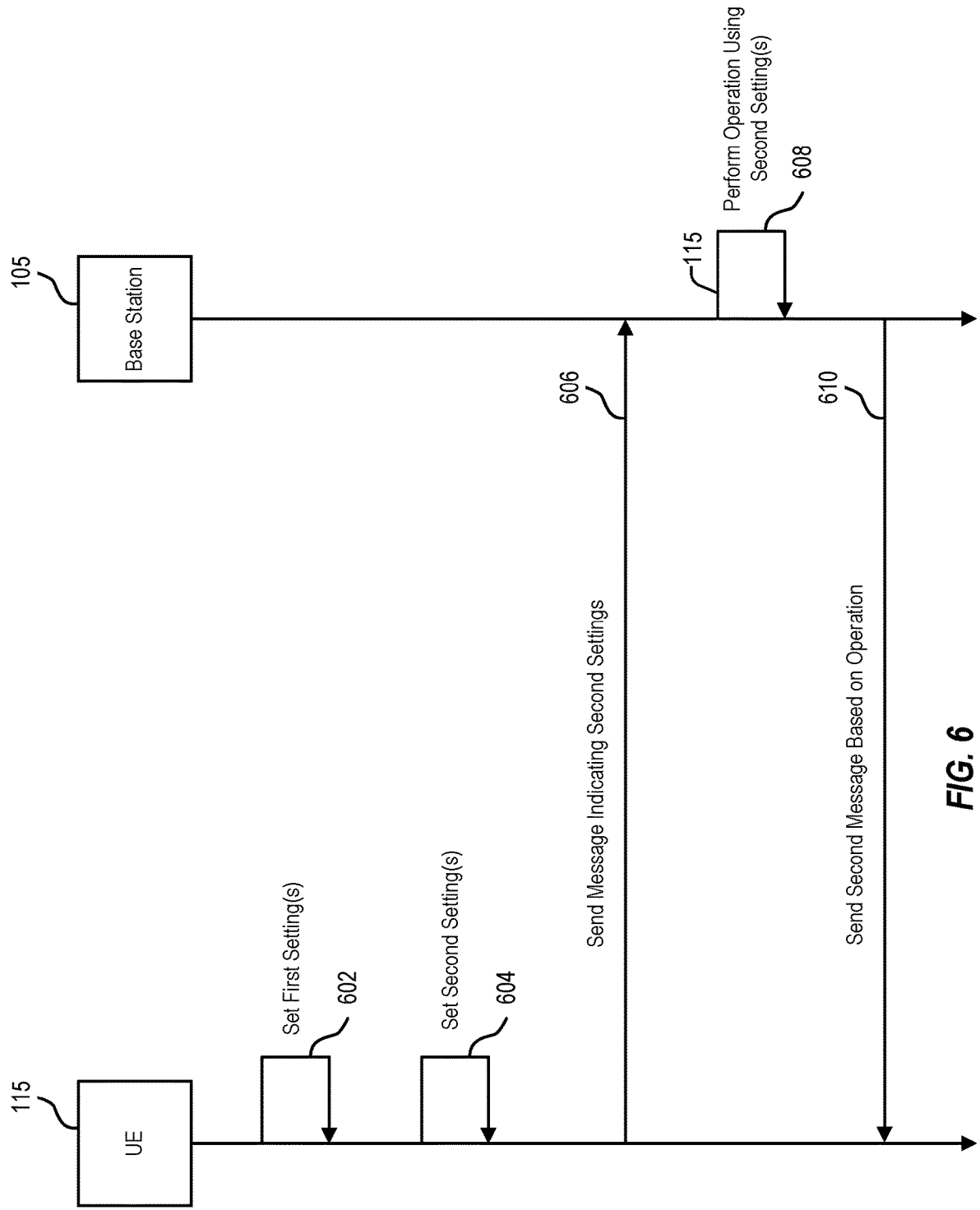
FIG. 6 is a ladder diagram illustrating an example of sharing frequency settings for a frequency generator of a UE according to aspects of the present disclosure.

FIG. 6 depicts a ladder diagram illustrating an example of sharing frequency settings for a frequency generator of a UE. As shown in FIG. 6, a system of the ladder diagram includes UE 115 and base station 105. UE 115 and base station 105 may include one or more components and be configured to perform one or more operations, as described with reference to FIGS. 1-3.

During operation, at 602, UE establishes (e.g., sets) a first frequency setting of a frequency generator of UE 115. The first frequency setting may include or correspond to first setting 306, and the frequency generator may include or correspond to frequency generator 314. In some implementations, the frequency generator is a local oscillator (LO). The first frequency setting may be shared with base station 105, such as during a radio resource control (RRC) setup process, such that base station 105 stores the first frequency settings.

At 604, UE 115 modifies the first frequency setting to generate second frequency setting. The second frequency setting may include or correspond to second setting 308. For example, UE 115 may modify a frequency of a signal output by the LO. The second frequency setting corresponds to a second frequency that is different from a first frequency corresponding to the first frequency setting. As a non-limiting example, the first frequency setting may correspond to a frequency that is substantially centered within an operating bandwidth, and the second frequency setting may correspond to a frequency that is closer to a frequency of an assigned resource block within the operating bandwidth.

At 606, UE 115 sends a message to base station 105 to indicate the second frequency setting. The message may include or correspond to message 320. The second frequency setting may be indicated by a frequency value or by an offset from the first frequency setting. In a particular implementation, the message is a UE assistance information message that indicates the second frequency setting. For example, an extendedRFSignalling information element of the UE assistance information message may indicate the second frequency setting. In another particular implementation, the message is a MAC control element. The MAC control element may correspond to a single carrier or to multiple carriers.

At 608, base station 105 performs one or more operations based on the second frequency settings. For example, base station 105 may perform a DC cancellation operation or a scheduling operation for a DC subcarrier, as non-limiting examples.

At 610, base station 105 sends a second message to UE 115 based on the operation. The second message may include or correspond to second message 340. For example, the second message may include an instruction to be performed at UE 115 to improve a signal quality metric, such as SNR or maximum throughput.

Thus, FIG. 6 illustrates operations between a UE and a base station that enable the base station to receive updated frequency settings for a frequency generator at the UE. The base station may use the updated frequency settings to perform one or more operations that improve signal quality metrics associated with the UE.

Figure 9:
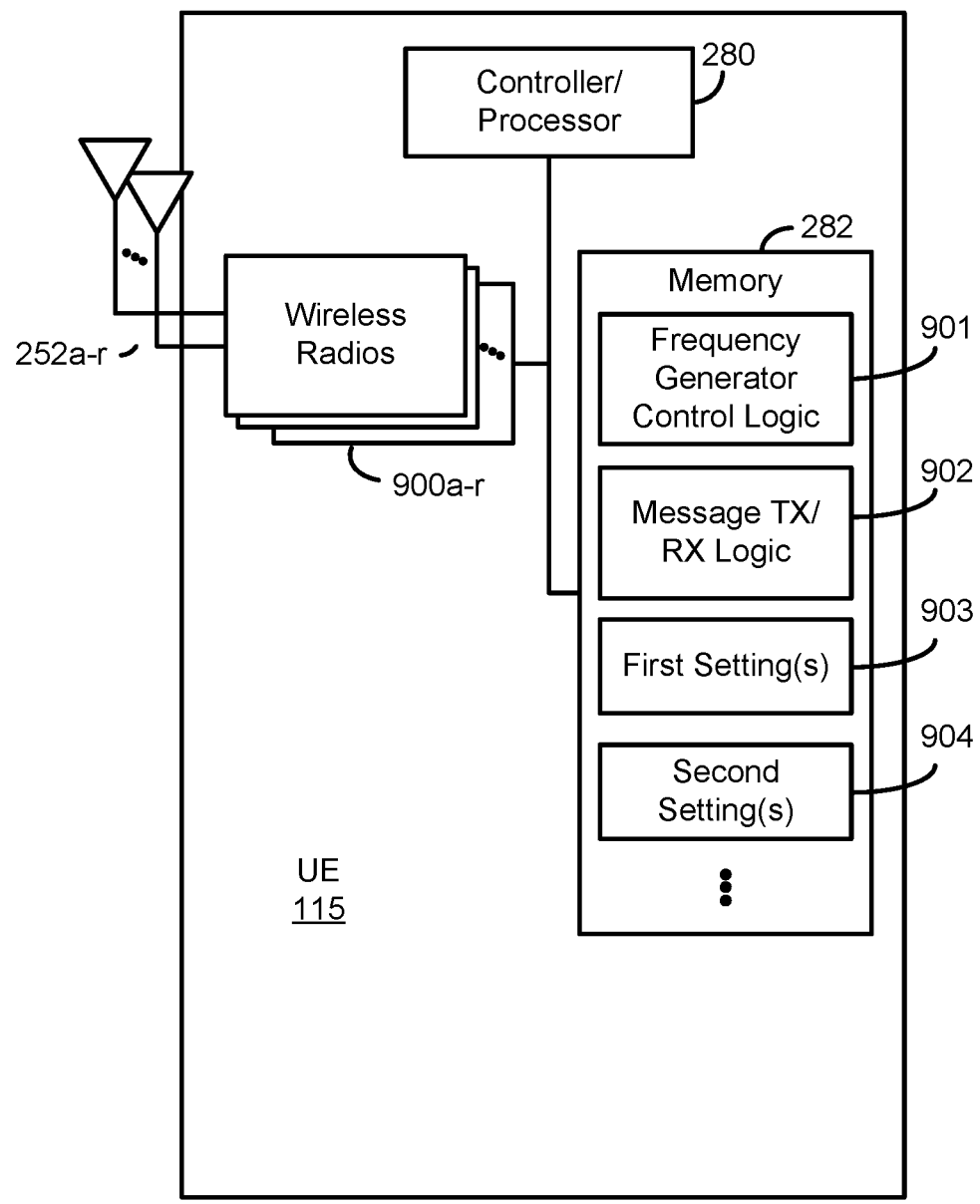
FIG. 9 is a block diagram conceptually illustrating a design of a UE according to some embodiments of the present disclosure.
Figure 10:
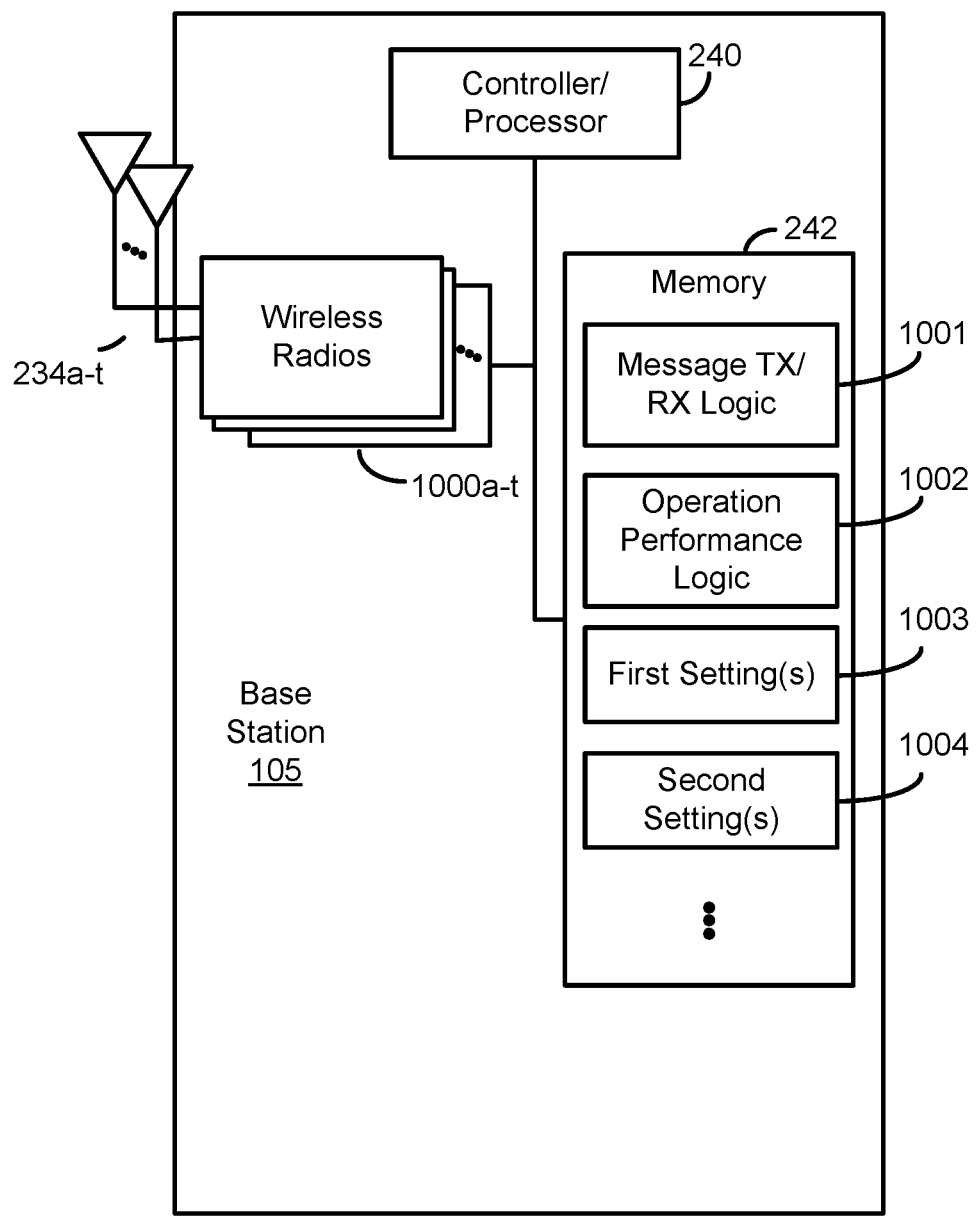
FIG. 10 is a block diagram conceptually illustrating a design of a base station configured according to some embodiments of the present disclosure.

FIG. 7 is a block diagram illustrating example blocks executed by a UE configured according to an aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900a-r and antennas 252a-r. Wireless radios 900a-r includes various components and hardware, as illustrated in FIG. 2 for UE 115, including modulator/demodulators 254a-r, MIMO detector 256, receive processor 258, transmit processor 264, and TX MIMO processor 266. UE 115 may receive signals from and/or transmit signal to a base station, such as base station 105 as illustrated in FIG. 10. The base station 105 of FIG. 10 includes similar components to UE 115 of FIG. 9. For example, the base station 105 may include corresponding components 1001-1004 which correspond to components 901-904 of the UE 115.

Returning to description of FIG. 7, at block 700, a UE determines a first frequency setting for a frequency generator of the UE. The first frequency setting is associated with a first frequency. A UE, such as UE 115, may execute, under control of controller/processor 280, frequency generator control logic 901, stored in memory 282. The execution environment of frequency generator control logic 901 provides the functionality for UE 115 to set first setting 903 for the frequency generator (e.g., a LO). First setting 903 may include or correspond to first setting 306. The execution environment of frequency generator control logic 901 determines different settings (associated with different frequencies) for the frequency generator of UE 115.

At block 701, the UE modifies the first frequency setting to generate a second frequency setting for the frequency generator. The second frequency setting is associated with a second frequency that is different from the first frequency. The execution environment of frequency generator control logic 901 provides UE 115 the functionalities described with respect to the various aspects of the present disclosure. Within the execution environment of frequency generator control logic 901, UE 115, under control of controller/processor 280, modifies first setting 903 to generate second setting 904 for the frequency generator. Second setting 904 may include or correspond to second setting 308. First setting 903 is associated with a first frequency (e.g., a frequency of a first signal output by the frequency generator) and second setting 904 is associated with a second frequency (e.g., a frequency of a second signal output by the frequency generator) that is different from the first frequency. Thus, settings of the frequency generator may be modified such that the frequency of the signal output by the frequency generator is different than an initial frequency, which may be a frequency of a center of a carrier with which UE 115 is configured to communicate via. In some implementations, second setting 904 may be generated based on initiation of a fast frequency hopping mode at UE 115, based on activation or deactivation of one or more carriers during operation in a shared transmit mode at UE 115, based on offset zero intermediate frequency/low intermediate frequency (OZIF/LIF) operations, or based on initiation of a band jammer mode at UE 115, as non-limiting examples, or based on interference or a co-existence parameter associated with multiple radios or multiple subscriptions at UE 115.

At block 702, the UE generates a message that indicates the second frequency setting. The UE (e.g., UE 115) may execute, under control of controller/processor 280, message TX/RX logic 902, stored in memory 282. The execution environment of message TX/RX logic 902 provides the functionality for UE 115 to generate the message. The message indicates second setting 904. Second setting 904 may be indicated as a frequency value or as an offset value (e.g., from first setting 903), such as a number of subcarriers or a value in Hertz (Hz). In some implementations, the message is a UE assistance information message. In some such implementations, the UE assistance information message includes an extendedRFSignalling information element, and the extendedRFSignalling information element indicates second setting 904. In other implementations, the message is a MAC control element that can correspond to a single carrier or to multiple carriers.

At block 703, the UE transmits the message from the UE to a base station. For example, UE 115 may transmit the message to base station 105 via wireless radios 900a-r and antennas 252a-r.

FIG. 8 is a block diagram illustrating example blocks executed by a base station configured according to an aspect of the present disclosure. The example blocks will also be described with respect to base station 105 as illustrated in FIG. 10. FIG. 10 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1000a-t and antennas 234a-t. Wireless radios 1000a-t includes various components and hardware, as illustrated in FIG. 2 for base station 105, including modulator/demodulators 232a-t, transmit processor 220, TX MIMO processor 230, MIMO detector 236, and receive processor 238.

Returning to description of FIG. 8, at block 800, a base station stores a first frequency setting for a frequency generator of a UE. The first frequency setting is associated with a first frequency. A base station, such as base station 105, may execute, under control of controller/processor 240, message TX/RX logic 1001, stored in memory 242. The execution environment of message TX/RX logic 1001 provides the functionality for base station 105 to receive and store first setting 1003 corresponding to a frequency generator of a UE (e.g., UE 115). First setting 1003 may include or correspond to first setting 306 or first setting 903. The execution environment of message TX/RX logic 1001 receives first setting 1003 (e.g., during a RRC configuration) and stores first setting 1003 at memory 242.

At block 801, the base station receives a message from the UE. The message indicates a second frequency setting for the frequency generator. The second frequency setting is associated with a second frequency that is different from the first frequency. The execution environment of message TX/RX logic 1001 provides base station 105 the functionalities described with respect to the various aspects of the present disclosure. Within the execution environment of message TX/RX logic 1001, base station 105, under control of controller/processor 240, receives the message via wireless radios 1000a-t and antennas 234a-t. Second setting 1004 may include or correspond to second setting 308 or second setting 904. First setting 1003 is associated with a first frequency (e.g., a frequency of a first signal output by the frequency generator) and second setting 1004 is associated with a second frequency (e.g., a frequency of a second signal output by the frequency generator) that is different from the first frequency. Thus, settings of the frequency generator may be modified such that the frequency of the signal output by the frequency generator is different than an initial frequency, which may be a frequency of a center of a carrier with which UE 115 is configured to communicate via.

At block 802, the base station performs an operation based on the second frequency setting. The base station (e.g., base station 105) may execute, under control of controller/processor 240, operation performance logic 1002, stored in memory 242. The execution environment of operation performance logic 1002 provides the functionality for base station 105 to perform an operation based on second setting 1004. In some implementations, the operation may include a DC cancellation operation or a scheduling operation for a DC subcarrier.

At block 803, the base station transmits a second message to the UE based on performance of the operation. For example, base station 105 may execute message TX/RX logic 1001 to transmit a second message to UE 115 via wireless radios 1000a-t and antennas 234a-t. In some implementations, the message may include an instruction to be performed at UE 115 to improve a signal quality metric associated with UE 115.

In some aspects, techniques for enabling sharing of frequency generator settings may include additional aspects, such as any single aspect or any combination of aspects described below and/or in connection with one or more other processes or devices described elsewhere herein. In some aspects, enabling sharing of frequency generator settings may include an apparatus determining a first frequency setting for a frequency generator. The first frequency setting is associated with a first frequency. The apparatus may also modify the first frequency setting to generate a second frequency setting for the frequency generator. The second frequency setting is associated with a second frequency that is different from the first frequency. The apparatus may also generate a message that indicates the second frequency setting. The apparatus may further transmit the message to a base station. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a first aspect, the frequency generator comprises a local oscillator.

In a second aspect, alone or in combination with the first aspect, the message comprises a UE assistance information message.

In a third aspect, in combination with the second aspect, the UE assistance information message includes an extendedRFSignalling information element. The extendedRFSignalling information element indicates the second frequency setting.

In a fourth aspect, alone or in combination with the first aspect, the message comprises a MAC control element.

In a fifth aspect, in combination with the fourth aspect, the MAC control element corresponds to a single carrier.

In a sixth aspect, in combination with the fourth aspect, the MAC control element corresponds to multiple carriers.

In a seventh aspect, alone or in combination with one or more of the first through sixth aspects, the first frequency setting corresponds to an initial frequency output by the frequency generator. The second frequency setting corresponds to an adjusted frequency output by the frequency generator.

In an eighth aspect, alone or in combination with one or more of the first through seventh aspects, the second frequency setting is indicated by the second frequency.

In a ninth aspect, alone or in combination with one or more of the first through seventh aspects, the second frequency setting is indicated as an offset from the first frequency setting.

In a tenth aspect, in combination with the ninth aspect, the offset is indicated by a number of subcarriers.

In an eleventh aspect, in combination with the ninth aspect, the offset is indicated in Hertz.

In a twelfth aspect, alone or in combination with one or more of the first through eleventh aspects, the apparatus initializes a timer upon transmission of the message and refrains from transmitting a second message until expiration of the timer. The second message indicates a third frequency setting for the frequency generator.

In a thirteenth aspect, in combination with the twelfth aspect, no transmit performance measurements are to be performed at the base station prior to the start time.

In a fourteenth aspect, alone or in combination with one or more of the first through thirteenth aspects, the first frequency setting is modified based on initiation of a fast frequency hopping mode at the apparatus.

In a fifteenth aspect, in combination with the fourteenth aspect, the fast frequency hopping mode is initiated based on a long-term evolution band combination in an Evolved Universal Terrestrial Radio Access—New Radio Dual Connectivity mode.

In a sixteenth aspect, alone or in combination with one or more of the first through fifteenth aspects, the first frequency setting is modified based on activation or deactivation of one or more carriers during operation in a shared transmit mode.

In a seventeenth aspect, alone or in combination with one or more of the first through sixteenth aspects, the first frequency setting is modified based on initiation of a band jammer mode of the apparatus, based on interference or a co-existence parameter associated with multiple radios or multiple subscriptions at the apparatus, or a combination thereof.

In an eighteenth aspect, in combination with the seventeenth aspect, the band jammer mode is associated with a single carrier, with carrier aggregation, or with Evolved Universal Terrestrial Radio Access—New Radio Dual Connectivity.

In some aspects, an apparatus configured for wireless communication, such as a base station, is configured to store a first frequency setting for a frequency generator of a UE. The first frequency setting is associated with a first frequency. The apparatus is also configured to receive a message from the UE. The message indicates a second frequency setting for the frequency generator. The second frequency setting is associated with a second frequency that is different from the first frequency. The apparatus is also configured to perform an operation based on the second frequency setting. The apparatus is further configured to transmit a second message to the UE based on performance of the operation. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a nineteenth aspect, the operation comprises a DC cancellation operation.

In a twentieth aspect, the operation comprises a scheduling operation for a DC subcarrier.

In a twenty-first aspect, alone or in combination with one or more of the nineteenth through twentieth aspects, the first frequency setting is stored during an initial setup process of the UE.

In a twenty-second aspect, alone or in combination with one or more of the nineteenth through twenty-first aspects, the frequency generator comprises a local oscillator of the UE.

In a twenty-third aspect, alone or in combination with one or more of the nineteenth through twenty-second aspects, the message comprises a UE assistance information message.

In a twenty-fourth aspect, in combination with the twenty-third aspect, the UE assistance information message includes an extendedRFSignalling information element. The extendedRFSignalling information element indicates the second frequency setting.

In a twenty-fifth aspect, alone or in combination with one or more of the nineteenth through twenty-second aspects, the message comprises a MAC control element.

In a twenty-sixth aspect, in combination with the twenty-fifth aspect, the MAC control element corresponds to a single carrier.

In a twenty-seventh aspect, in combination with the twenty-fifth aspect, the MAC control element corresponds to multiple carriers.

In a twenty-eighth aspect, alone or in combination with one or more of the nineteenth through twenty-seventh aspects, the second frequency setting is indicated as the second frequency.

In a twenty-ninth aspect, alone or in combination with one or more of the nineteenth through twenty-seventh aspects, the second frequency setting is indicated as an offset from the first frequency setting.

In a thirtieth aspect, in combination with the twenty-ninth aspect, the offset is indicated by a number of subcarriers.

In a thirty-first aspect, alone or in combination with one or more of the nineteenth through thirtieth aspects, the apparatus refrains from measuring transmit performance metrics until expiration of a particular time period.

In a thirty-second aspect, in combination with the thirty-first aspect, the particular time period is fixed.

In a thirty-third aspect, alone or in combination with one or more of the thirty-first through thirty-second aspects, the message further includes an indication of a duration of the particular time period.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps (e.g., the logical blocks in FIGS. 9 and 10) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication comprising:
   determining, by a user equipment (UE), a first frequency setting for a frequency generator of the UE, the first frequency setting associated with a first frequency;
   modifying the first frequency setting to generate a second frequency setting for the frequency generator, the second frequency setting associated with a second frequency that is different from the first frequency and within the same carrier bandwidth as first frequency;
   generating a message that indicates the second frequency setting; and
   transmitting the message from the UE to a base station.

2. The method of claim 1, wherein the message comprises a UE assistance information message that includes an extendedRFSignalling information element, and wherein the extendedRFSignalling information element indicates the second frequency setting.

3. The method of claim 1, wherein the message comprises a media access control (MAC) control element, and wherein the MAC control element corresponds to a single carrier.

4. The method of claim 1, wherein the message comprises a media access control (MAC) control element, and wherein the MAC control element corresponds to multiple carriers.

5. The method of claim 1, further comprising:
   initializing a timer upon transmission of the message; and
   refraining from transmitting a second message until expiration of the timer, the second message indicating a third frequency setting for the frequency generator.

6. The method of claim 1, wherein the first frequency setting is modified based on initiation of a fast frequency hopping mode at the UE.

7. The method of claim 6, wherein the fast frequency hopping mode is initiated based on a long-term evolution band combination in an Evolved Universal Terrestrial Radio Access-New Radio Dual Connectivity mode.

8. The method of claim 1, wherein the first frequency setting is modified based on activation or deactivation of one or more carriers during operation in a shared transmit mode.

9. The method of claim 1, wherein the first frequency setting is modified based on initiation of a band jammer mode of the UE, based on interference or a co-existence parameter associated with multiple radios or multiple subscriptions at the UE, or a combination thereof.

10. The method of claim 9, wherein the band jammer mode is associated with a single carrier, with carrier aggregation, or with Evolved Universal Terrestrial Radio Access-New Radio Dual Connectivity.

11. The method of claim 1, wherein the first frequency is within an approximate center of the carrier bandwidth and the second frequency is within the carrier bandwidth and outside of the approximate center.

12. The method of claim 1, wherein the first frequency setting is modified based on initiation of a fast frequency hopping mode at the UE, based on activation or deactivation of one or more carriers during operation in a shared transmit mode, based on initiation of a band jammer mode at the UE, or based on interference or a co-existence parameter associated with multiple radios or multiple subscriptions at the UE.

13. An apparatus configured for wireless communication, the apparatus comprising:
    at least one processor; and
    a memory coupled to the at least one processor, the memory storing instructions that, when executed by the at least one processor, cause the at least one processor to:
        determine, by a user equipment (UE), a first frequency setting for a frequency generator of the UE, the first frequency setting associated with a first frequency;
        modify the first frequency setting to generate a second frequency setting for the frequency generator, the second frequency setting associated with a second frequency that is different from the first frequency and within the same carrier bandwidth as first frequency;
        generate a message that indicates the second frequency setting; and
        initiate transmission of the message from the UE to a base station.

14. The apparatus of claim 13, wherein the frequency generator comprises a local oscillator.

15. The apparatus of claim 13, wherein the second frequency setting is indicated by the second frequency.

16. The apparatus of claim 13, wherein the second frequency setting is indicated as an offset from the first frequency setting.

17. The apparatus of claim 16, wherein the offset is indicated by a number of subcarriers or in Hertz.

18. The apparatus of claim 13, wherein the message further includes an indication of a start time for which the second frequency setting is to be applied at the base station, and wherein no transmit performance measurements are to be performed at the base station prior to the start time.

19. A method of wireless communication comprising:
    storing, at a base station, a first frequency setting for a frequency generator of a user equipment (UE), the first frequency setting associated with a first frequency;
    receiving a message at the base station from the UE, the message indicating a second frequency setting for the frequency generator, the second frequency setting associated with a second frequency that is different from the first frequency and within the same carrier bandwidth as first frequency;
    performing, at the base station, an operation based on the second frequency setting; and
    transmitting a second message from the base station to the UE based on performance of the operation.

20. The method of claim 19, wherein the operation comprises a direct current (DC) cancellation operation.

21. The method of claim 19, wherein the operation comprises a scheduling operation for a direct current (DC) subcarrier.

22. The method of claim 19, wherein the first frequency setting is stored during an initial setup process of the UE.

23. The method of claim 19, further comprising refraining, at the base station, from measuring transmit performance metrics until expiration of a particular time period.

24. The method of claim 23, wherein a duration of the particular time period is fixed or indicated by the message.

25. The method of claim 19, wherein the operation comprises a direct current (DC) cancellation operation or a scheduling operation for a DC subcarrier.

26. An apparatus configured for wireless communication, the apparatus comprising:
    at least one processor; and
    a memory coupled to the at least one processor, the memory storing instructions that, when executed by the at least one processor, cause the at least one processor to:
        store, at a base station, a first frequency setting for a frequency generator of a user equipment (UE), the first frequency setting associated with a first frequency;
        receive a message at the base station from the UE, the message indicating a second frequency setting for the frequency generator, the second frequency setting associated with a second frequency that is different from the first frequency and within the same carrier bandwidth as first frequency;
        perform, at the base station, an operation based on the second frequency setting; and
        initiate transmission of a second message from the base station to the UE based on performance of the operation.

27. The apparatus of claim 26, wherein the message comprises a UE assistance information message that includes an extendedRFSignalling information element, and wherein the extendedRFSignalling information element indicates the second frequency setting.

28. The apparatus of claim 26, wherein the message comprises a media access control (MAC) control element, and wherein the MAC control element corresponds to a single carrier.

29. The apparatus of claim 26, wherein the message comprises a media access control (MAC) control element, and wherein the MAC control element corresponds to multiple carriers.

30. The apparatus of claim 26, wherein the second frequency setting is indicated as an offset from the first frequency setting, and wherein the offset is indicated by a number of sub carriers.

* * * * *